`United States Patent Office`

3,284,300
Patented Nov. 8, 1966

---

3,284,300
SUBSTITUTED YOHIMBANE COMPOSITIONS
AND METHODS OF USE
John Shavel, Jr., Mendham, and Maximilian von Strandt-
mann, Rockaway Township, N.J., assignors to Warner-
Lambert Pharmaceutical Company, Morris Plains,
N.J., a corporation of Delaware
No Drawing. Filed July 21, 1964, Ser. No. 384,259
8 Claims. (Cl. 167—65)

This application is a continuation-in-part of our co-pending application Serial No. 278,735, filed May 7, 1963, now abandoned.

This invention relates to new compositions of matter and to methods of using the same. More particularly, this invention relates to therapeutic compositions containing substituted yohimbane alkaloids which are useful as anti-inflammatory-analgesic agents.

Various therapeutic agents have been proposed for producing analgesia and anti-inflammatory action. Thus, there are, for example, analgesics such as codeine or morphine, which while indeed very potent, do not possess any anti-inflammatory activity. In addition, because of their addiction liability, their use is necessarily limited. On the other hand, analgesics of the aspirin-type such as N-acetyl-p-aminophenol and acetylsalicyclic acid although relatively safe and nonaddicting, have been associated with many undesirable side effects including gastric irritation and ulcerogenesis. Obviously, because of these side effects they are not entirely suitable for administration over a long period of time, as in the case of rheumatic patients.

Attempts to achieve analgesia coupled with anti-inflammatory activity have resulted in the development of a number of drugs. Thus, for example, steroids such as cortisone in combination with aspirin have been proposed to reduce inflammation and produce analgesia. Generally, while these steroid-aspirin combinations do possess significant anti-inflammatory and analgesic activity, they also exert a profound influence on metabolism and ulcerogenesis. In addition, their ability to achieve the total therapeutic effect desired has been found to be somewhat disappointing. Their use is, consequently, somewhat limited. Later studies, for example, have led to the introduction of the phenylbutazone type of compounds which while they do show a distinct improvement over previous combinations, also are responsible for many undesirable toxic symptoms. Furthermore, due to the lack of significant analgesic properties, these phenylbutazones are also quite limited in their therapeutic application.

From the foregoing, it is quite evident that there has been a long-felt need for a therapeutic composition which is safe and nonaddicting and yet can achieve the desired analgesic-anti-inflammatory effect.

It is, therefore, a primary object of this invention to provide a novel therapeutic composition which has effective anti-inflammatory activity coupled with analgesia.

A further object of this invention is to provide novel compositions containing these anti-inflammatory analgesic agents.

Other objects and advantages of this invention will become apparent from the following detailed description.

We have now found that certain 1-substituted yohimbanes and their nontoxic pharmaceutically acceptable acid addition salts such as, for example, 1-methylyohimbane hydrochloride or 1-methylyohimbane sulfate are not only remarkably effective as analgesics but in addition are capable of effectively reducing inflammation and the inflammatory process in warm blooded animals. These substituted yohimbanes have the following structural formula:

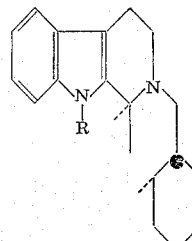

wherein R may be lower alkyl such as methyl or ethyl, cycloalkylmethyl such as cyclopropylmethyl, aralkyl such as benzyl or substituted benzoyl such as p-chlorobenzoyl, p-methylbenzoyl, m-methylbenzoyl, o-methylbenzoyl, 3,4-dimethylbenzoyl, p-fluorobenzoyl, o-bromobenzoyl, 2,4-dichlorobenzoyl, p-methoxybenzoyl, 3,4,5-trimethoxybenzoyl, 3,4-dimethoxybenzoyl and the like. These 1-substituted yohimbanes such as 1-methylyohimbane are prepared, for example, by the action on yohimbane of alkylating agents such as an alkyl halide in the presence of alkali metal hydride. We have found that dimethyl carbonate in the presence of sodium hydride is particularly advantageous as the alkylating agent for the preparation of 1-methylyohimbane. The reaction mixture is generally refluxed for about 12 hours under anhydrous conditions. The yohimbane reaction product is recovered by conventional extraction procedures from the mother liquor.

Other 1-substituted yohimbanes are prepared, for example, by the action of cycloalkyl-p-toluene-sulfonate, p-halo-benzoyl chloride or benzyl halide on yohimbane.

The analgesic activity of these compounds has been found to be more potent than codeine and their anti-inflammatory activity to be more potent than that of cortisone acetate in standard experimental animals such as mice or rats.

It is to be understood that the new and novel compounds of this invention may be used as the free base or may be converted into the corresponding nontoxic pharmaceutically acceptable acid addition and quaternary ammonium salts. Exemplary of nontoxic acid addition salts are those formed with maleic, fumaric, benzoic, ascorbic, succinic, bismethylensalicyclic, methylsulfonic, ethanedisulfonic, acetic, propionic, tartaric, salicylic, citric, gluconic, lactic, malic, mandelic, cinnamic, citraconic, stearic, palmitic, itaconic, glycolic, benzenesulfonic, hydrochloric, hydrobromic, sulfuric, sulfamic, phosphoric, and nitric acids. The acid addition salts may be prepared in the conventional manner, for example, by treating a solution or suspension of the free base in an organic solvent with the desired acid and then recovering the salt which forms by crystallization techniques. The quaternary salts are prepared by heating a suspension of the base in a suitable solvent with a reactive alkyl halide such as methyl iodide, ethyl bromide, n-hexyl bromide, benzyl chloride or a reactive ester such as methyl sulfate, ethyl sulfate or methyl p-toluene-sulfonate.

The new and novel 1-substituted yohimbanes as either the free base or in the form of its nontoxic salts may be formulated with a conventional pharmaceutical carrier for oral or parenteral administration and used to form tablets, capsules, elixirs, solutions or suspensions for injection, suppositories and the like. Each dosage unit will normally contain about 2 to about 100 mg. of the active ingredient with a range of 5 to 25 mg. being generally preferred. The total daily dosage is normally in the range of 5 to 200 mg.

The following examples are included in order further to illustrate the invention.

EXAMPLE 1

1-methylyohimbane.—A solution of 10 g. yohimbane, 10 g. of 50% NaH dispersion in oil and 100 ml. dimethyl carbonate in 600 ml. tetrahydrofuran is refluxed for 12 hours under stirring while protected from moisture. After cooling, the contents of the flask are poured in a slow stream, under vigorous stirring, into a mixture of 500 g. crushed ice and 100 ml. acetic acid. The resulting solution is then concentrated in vacuo to remove the tetrahydrofuran. The remaining aqueous solution is further diluted with an equal amount of water and filtered over "Supercel." After the clear filtrate has been made basic with 10% aqueous ammonia, the desired reaction product, 1-methylyohimbane, comes out as a white precipitate which is collected on a filter, washed with water and dried in a vacuum desiccator over sulfuric acid. Yield: 9.8 g. The material is purified by recrystallization from acetone. M.P. 178°–190° C., $[\alpha]_D^{25}=-116°$, (pyridine, c.=0.8).

Analysis for $C_{20}H_{27}N_2$—Calc.: C, 81.58; H, 8.90; N, 9.52. Found: C, 81.43; H, 8.70; N, 9.38.

I.R.: 976(m.), 1130(m.) cm.$^{-1}$. No absorption in the 3000–4000 cm.$^{-1}$ region.

U.V.: 229.5 (38,000), 251 (2,500), 285 (7,750), 292 (7,000), m$\mu$ (shoulder).

EXAMPLE 2

1-methylyohimbane hydrochloride.—Gaseous hydrogen chloride is introduced for 15 minutes into a chilled solution of 18 g. 1-methylyohimbane in 100 ml. methylene chloride. The 1-methylyohimbane hydrochloride formed is precipitated with petroleum ether and recrystallized from acetonitrile. M.P. 270°–274° C., $[\alpha]_D^{25}=35°$, water, c.=0.35%.

Analysis for $C_{20}H_{26}N_2 \cdot HCl$—Calc.: C, 72.60; H, 8.22; Cl, 10.71. Found: C, 72.56; H, 8.33; Cl, 10.77, 10.87.

EXAMPLE 3

1-cyclopropylmethylyohimbane.—A solution prepared by dissolving yohimbane (2.8 g.) in dimethylformamide (50 ml.) and sodium hydride 55% oil suspension (0.55 g.) is treated dropwise at 0° C. under exclusion of moisture with a solution of cyclopropylmethyl alcohol p-toluenesulfonate (2.5 g.) in dimethylformamide (20 ml.). After stirring at 0° C. for 1.5 hours and at 25° to 30° C. for one hour the reaction mixture is treated with acetic acid (1 ml.), stirred for 10 minutes and extracted 3 times with a mixture of water and chloroform (75 ml.:75 ml.). The combined chloroform extracts are dried over sodium sulfate, filtered, and evaporated in vacuo. The residue is recrystallized from ethyl acetate to give 1-cyclopropylmethylyohimbane, melting at 171°–173.5° C.; yield 1.36 g.; $[\alpha]_D^{25}=-57°$ (1% in pyridine).

Analysis for $C_{23}H_{30}N_2$—Calc.: C, 82.59; H, 9.04; N, 8.37. Found: C, 82.48; H, 9.20; N, 8.35.

EXAMPLE 4

1-benzylyohimbane.—Yohimbane (2.8 g.) is added portionwise to a solution prepared from Na (0.23 g.) and liquid ammonia (100 ml.). The reaction mixture is stirred for 0.5 hour and treated dropwise with a solution of benzyl bromide (1.75 g.) in ether (10 ml.). After stirring for 20 minutes the $CO_2$-acetone bath is removed and ammonia allowed to evaporate. The residue is treated with water (200 ml.) and extracted with two 50 ml. portions of chloroform. The combined extracts are dried over sodium sulfate and evaporated in vacuo. The residue crystallized from acetonitrile gives 1-benzylyohimbane, melting at 186.5° C.; yield 1.03 g.; $[\alpha]_D^{25}=-115°$ (0.4% in pyridine).

Analysis for $C_{26}H_{30}N_2$—Calc.: C, 84.29; H, 8.16; N, 7.56. Found: C, 84.30; H, 8.27; N, 7.59.

EXAMPLE 5

1-(p-chlorobenzoyl)yohimbane.—A solution of yohimbane (2.4 g.) in dimethylformamide (120 ml.) containing sodium hydride suspension in oil (0.24 g.) is treated dropwise with stirring at 0° C. under nitrogen, with a solution of p-chlorobenzoyl chloride (1.6 g.) in dimethylformamide (10 ml.). After stirring for 4 hours at 0° C. and allowing to stand 18 to 24 hours at 25° to 30° C., the reaction mixture is treated with 1 ml. acetic acid, stirred for 10 minutes and diluted with water. The solution is extracted twice with chloroform (2×150 ml.) and the combined extracts are dried over sodium sulfate and evaporated in vacuo. The oily residue is purified by chromatography over fluorosil (40 g.) using ethyl acetate as eluant to give 1.3 g. of 1-(p-chlorobenzoyl)yohimbane as crystalline material which is recrystallized from ethyl acetate, M.P. 188°–189.5° C.; $[\alpha]_D^{25}=-284°$ (0.6% in pyridine).

Analysis for $C_{26}H_{27}N_2OCl$—Calc.: C, 74.54; H, 6.49; N, 6.69. Found: C, 74.67; H, 6.64; N, 6.49.

EXAMPLE 6

25 g. of 1-methylyohimbane is thoroughly blended with 416 g. of lactose and 9 g. of magnesium stearate. 450 mg. of the resulting mixture is then filled into No. 1 hard gelatin capsules, each capsule containing 25 mg. active ingredient.

EXAMPLE 7

The effectiveness of 1-methylyohimbane, for example, as an analgesic is determined in accordance with the following procedure.

The accepted method for the determination of analgesic activity is that described by Eddy et al., J. Pharmacol & Exper. Therap. 107: 385 (1953). The basis of this method is the determination of the reaction time, in seconds, of a mouse to thermal stimulus.

Female mice weighing about 18 to 24 grams are used. The reaction time is recorded as that time increment from the placement of the mouse on the copper surface of a bath, containing a constant boiling mixture such as ethyl formate and acetone at a temperature of about 55° to 55.5° C., to the reaction of the mouse to such a heat stimulus which consists of blowing on the forepaws, fanning of a hind paw or a sudden jump. These reactions usually occur in this sequence and either of the first two is to be preferred as an end point.

In carrying out the test, three groups of ten mice each are used. A different dose of the analgesic to be investigated is administered orally to each group. Each mouse is its own control. The reaction time of the mouse to the heat stimulus is measured at 15, 30, 60, 90 and 120 minutes after the administration of the drug.

The percent increase in reaction time over that of the pre-drug reaction time is then calculated. These percent increases are then averaged for each group and the average plotted against the log of the dose on logarithmic probability paper. An effective dose ($ED_{50}$) is easily calculated from this graph according to probit analysis. This test procedure affords a reliable and convenient method for evaluating the analgesic properties of various compounds. The lower the $ED_{50}$, the more effective the material is as an analgesic.

The $ED_{50}$ for 1-methylyohimbane as determined by the above-described test procedure is tabulated below.

The $ED_{50}$ values for aspirin, phenylbutazone and codeine are shown for comparative purposes.

*Table 1*

| Compound: | $ED_{50}$ mg./kg. |
|---|---|
| 1-methylyohimbane | 1.2 |
| Codeine | 22 |
| Aspirin | over 1000 |
| Phenylbutazone | 63 |

EXAMPLE 8

The effectiveness of 1-methylyohimbane as an anti-inflammatory agent is demonstrated by the following in vivo test.

An accepted method for showing anti-inflammatory activity of a compound is that described by Meier et al., Experientia, 6: 469 (1950). This method is based on the observation that most foreign bodies when introduced in a vascularized part of an animal cause an inflammatory reaction in the adjacent tissues, characterized among other features, by the production of granuloma tissue. Cotton pellets are generally the preferred foreign agent used to induce inflammation.

In carrying out the test, groups of 6 female rats weighing about 150 grams each are used.

After the rats have been anesthetised, they are weighed and a sagittal incision of approximately ½ inch is made in the skin of the abdomen just below the umbilicus. A smooth-pointed scissors is then introduced laterally on each side in the subcutaneous tissue up to approximately 1.5 inches and gently opened. A sterile cotton pellet previously desiccated to constant weight and weighing about 70 mg. is then introduced on each side, and the incision closed.

One control group is included and another group receives a well-known anti-infllammatory compound such as cortisone which serves as a standard. The remaining test groups receive the compound being tested which is administered orally for 10 days at varying dose levels. On the 11th day after drug treatment has begun, these animals are sacrificed and the implanted pellets surrounded by the granuloma tissue are removed and weighed. The pellets are desiccated to constant weight and are weighed again. The dry cotton weight is then deducted to obtain the wet and dry weights of the granuloma. Results are expressed by the percent change in granuloma weight from the control values. The effective dose ($ED_{33}$) is that dose in mg. per kg. which can suppress 33% of granuloma weight increase.

The $ED_{33}$ for 1-methylyohimbane as determined by the above-described procedure is tabulated below. The $ED_{33}$ values for aspirin, phenylbutazone and cortisone acetate are included for comparative purposes.

*Table 2*

| Compound: | $ED_{33}$ mg./kg. |
|---|---|
| Cortisone acetate | 200 |
| Phenylbutazone | 200 |
| Aspirin | over 500 |
| 1-methylyohimbane | 50 |

EXAMPLE 9

The following test will demonstrate further the local anti-inflammatory activity of 1-methylyohimbane.

This method known as the granuloma pouch test was first described by Selye H., J.A.M.A. 152–1207, 1953. The principle of the test is based on the fact that in the rat a volume of air, when properly introduced under the skin, does not diffuse into the subcutaneous tissue, but remains localized. When an irritant is introduced in this artifically created cavity an inflammatory reaction ensues when can be quantitiated, the degree of inflammation being measured by the amount of exudate granually filling the pouch.

In carrying out the test, group of 6 female rats each weighing about 150 grams are used. One control group is generally introduced into the test as described above while another group receives a well-known anti-inflammatory agent such as cortisone. The remaining groups receive various dose levels of the compound 1-methylyohimbane.

After the pouches have been made in the rats and the irritant introduced, treatment begins and continues for 4 days. On the 5th day the rats are sacrificed and the amount of exudate from the pouches is accurately determined. Results are expressed by the percent change in the exudate volume from the control values. The effective dose ($ED_{50}$) is that dose level in mg. per kilo of bodyweight which can inhibit 50% of the exudate volume.

The $ED_{50}$ for 1-methylyohimbane as determined by the above-described test is tabulated below. The $ED_{50}$ values for aspirin, phenylbutazone and cortisone acetate are included for comparative purposes.

*Table 3*

| Compound: | $ED_{50}$ mg./kg. |
|---|---|
| Cortisone acetate | 90 |
| Phenylbutazone | 400 |
| Aspirin | over 500 |
| 1-methylyohimbane | 50 |

EXAMPLE 10

The effectiveness of 1-cyclopropylmethylyohimbane as an anti-inflammatory agent is also tested according to the procedure set forth in Example 8. It has been found that a dose of 10 mg./kg. 1-cyclopropylmethylyohimbane administered daily for 10 days is effective to reduce inflammation by 16.9%.

We claim:

1. A therapeutic composition comprising an inert pharmaceutical carrier and about 5 mg. to 200 mg. of a compound of the formula:

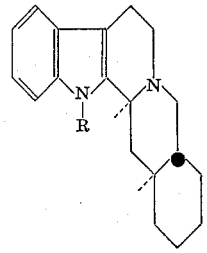

wherein R is a member selected from the group consisting of cycloalkylmethyl, halo benzoyl and benzyl and the nontoxic pharmaceutically acceptable acid addition salts thereof.

2. Method for the relief of pain and inflammation in a warm-blooded mammal which comprises administering to said mammal afflicted with pain and inflammation an effective amount of a composition according to claim 1.

3. Method for the relief of pain and inflammation in a warm-blooded mammal which comprises administering to said mammal afflicted with pain and inflammation a composition in dosage unit form comprising an inert pharmaceutical carrier and 5 mg. to 200 mg. of a member of the group consisting of 1-methylyohimbane and the nontoxic pharmaceutically acceptable acid addition salts.

4. Method for the relief of pain and inflammation in a warm-blooded mammal which comprises administering to said mammal afflicted with pain and inflammation a composition in dosage unit form comprising an inert pharmaceutical carrier and about 5 mg. to 200 mg. of a member of the group consisting of 1-cyclopropylmethylyohimbane and the nontoxic pharmaceutically acceptable acid addition salts.

5. Method for the relief of pain and inflammation in a warm-blooded mammal which comprises administering to said mammal afflicted with pain and inflammation a composition in dosage unit form comprising an inert pharmaceutical carrier and about 5 mg. to 200 mg. of a member of the group consisting of 1-benzylyohimbane and the nontoxic pharmaceutically acceptable acid addition salts.

6. An analgesic anti-inflammatory composition in dosage unit form comprising an inert pharmaceutical carrier and from about 5 mg. to 200 mg. of a member of the group consisting of 1-cyclopropylmethylyohimbane and the nontoxic pharmaceutically acceptable acid addition salts.

7. An analgesic anti-inflammatory composition in dosage unit form comprising an inert pharmaceutical carrier and from about 5 mg. to 200 mg. of a member of the group consisting of 1-benzylyohimbane and the nontoxic pharmaceutically acceptable acid addition salts.

8. An analgesic anti-inflammatory composition in dosage unit form comprising an inert pharmaceutical carrier and from about 5 mg. to 200 mg. of a member of the group consisting of 1-(p-chlorobenzoyl)yohimbane and the nontoxic pharmaceutically acceptable acid addition salts.

No references cited.

JULIAN S. LEVITT, *Primary Examiner.*

M. J. COHEN, *Assistant Examiner.*